J. J. RAMPLEY.
CULTIVATOR.
APPLICATION FILED NOV. 6, 1911.

1,017,465.

Patented Feb. 13, 1912.

WITNESSES
Samuel E. Wade
Amos W. Hart

INVENTOR
JOHN J. RAMPLEY
BY Munn & Co.
ATTORNEYS

UNITED STATES PATENT OFFICE.

JOHN J. RAMPLEY, OF CARNESVILLE, GEORGIA.

CULTIVATOR.

1,017,465.  Specification of Letters Patent.  Patented Feb. 13, 1912.

Application filed November 6, 1911. Serial No. 658,741.

*To all whom it may concern:*

Be it known that I, JOHN J. RAMPLEY, a citizen of the United States, and a resident of Carnesville, in the county of Franklin and State of Georgia, have invented an Improvement in Cultivators, of which the following is a specification.

The object of my invention is to provide an improved lister or double mold-board cultivator which is adapted for lateral adjustment to form lists of furrows at different distances apart; and a further object is to provide improved means for effecting such adjustment and for securing the shovel beams or standards firmly and rigidly in any adjustment.

The details of construction, arrangement, and operation of the invention are as hereinafter described, and illustrated in the accompanying drawing, in which—

Figure 1:
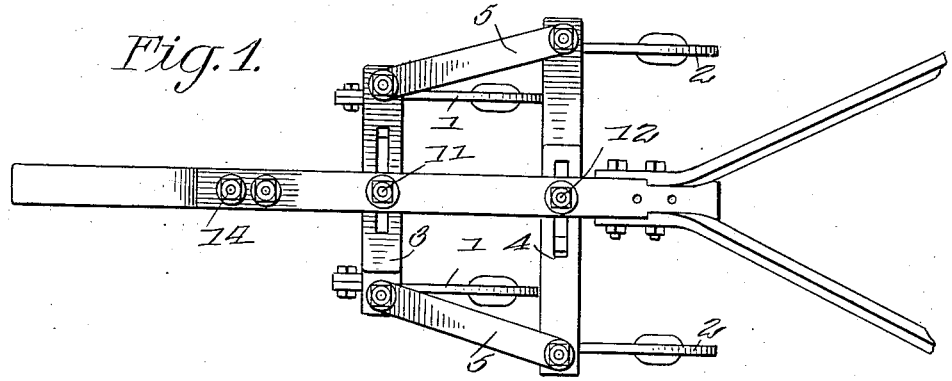
Figure 2:
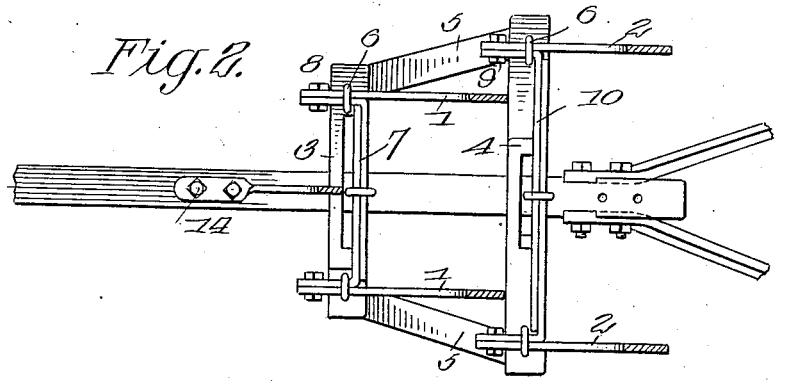
Figure 3:
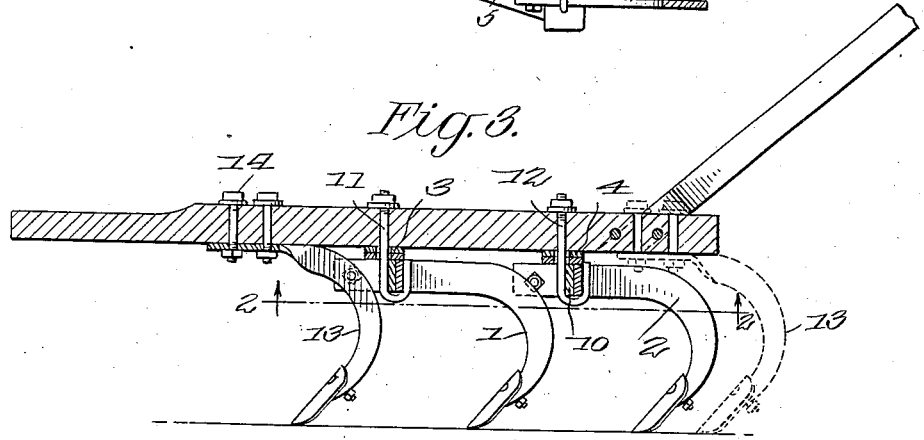
Figure 4:
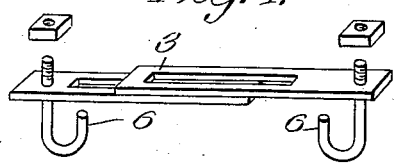

Figure 1 is a top plan view of the implement. Fig. 2 is a bottom plan view taken as a section on the line 2—2 of Fig. 3. Fig. 3 is a central longitudinal section of the implement. Fig. 4 is a perspective view illustrating the overlapping and adjustable cross-bars forming part of the frame to which the shovel beams or standards are attached.

There are four beams or shovel-carrying standards, two of them, indicated by the numeral 1, being arranged in front, and the others, indicated by the numeral 2, being arranged in the rear. It will be noted also that the front and rear beams are not in alinement, but so arranged that the shovels or wings attached to them will make adjacent lists or furrows so as to cover a comparatively wide field.

The laterally adjustable frame to which the several standards 1 and 2 are attached, and from which they are supported, is formed by two pairs of slotted, overlapping cross-bars indicated by 3 and 4, one pair, 3, being arranged in front, and the other pair, 4, in the rear, but parallel to each other. The outer ends of the bars of these two pairs are connected by flat bars 5, the ends of the bars 3, 4, and 5 being secured together by means of hook-shaped bolts 6—see especially Figs. 3 and 4.

The front beams or standards 1 are secured to a pair of transverse bars 7, and the rear standards 2 are similarly secured to a pair of transverse bars 10, and the bars of each pair are lapped and adapted for sliding endwise adjustment on each other. As shown best in Fig. 2, the ends of the members of each pair of bars 7 and 10 project forward at a right angle, and the upper ends of the beams or standards are laid flat alongside such ends and riveted thereto at 8 and 9. This is an important feature of my invention.

A bolt hook 11 passes down through the beam of the implement and through the slots in the front adjusting bars 3, and the hook portion embraces the middle portion of the bent bars 7. Thus one bolt serves to secure the front portion of the main frame to the beam and also to secure the front beams or standards and their carrying bars 7 in due position underneath the slotted bars 3. A bolt hook 12 is similarly employed to secure the rear beams or shovels 2 and the two sets of lapping bars 4 and 10 to each other and to the cultivator beam.

It will now be apparent that, by loosening the nuts of the hook bolts 11 and 12, the cross-bars 3 and 4 may be slid laterally on each other to widen or contract the main frame, and thus adjust the shovel-carrying beams wider apart or nearer each other, according to the work to be done. Then, by screwing down the nuts on the hook bolts 11 and 12, the parts may be all secured firmly and rigidly in the new adjustment. The hook bolts therefore perform a very important function in respect to holding the parts rigidly in place and permitting an easy and quick adjustment when required.

The angular form of the lapped bars 7 and 10 adapts them to lie against the under side of the transverse bars 3 and 4 in such manner that they are prevented from rocking, and a single hook bolt 6 serves to attach the beams 1 and bars 7 to the transverse slotted bars 3 and 4, and at the same time pivots the connecting side bars 5 to the cross-bars 3 and 4.

In front of the four shovel-carrying beams or standards already described, I arrange a fifth one indicated by 13, the same being secured by bolts 14 directly under the beam of the implement. This beam 13 may be applied in rear of the four beams 1, 2, when desired, and such position is indicated by dotted lines in Fig. 3.

I have not illustrated any particular form of shovel or wing, but propose to employ any that suit the purpose. The front foot or beam 13 will ordinarily be provided with a diamond-pointed shovel. It will be understood that the implement may be used either with or without this front foot or beam. In practice, the rear beams may be set to make a list of 32 inches wide, and the front beams may be set to form one 20 inches in width. The implement may be used to make a wide bed or list at one operation and then the same will be ready for the planting of corn or cotton. In other words, the implement will make four furrows or five, according as it is adjusted.

By removing the front central beam 13, the implement is adapted for straddling a row of plants and thus cultivating both sides of the same, at any distance. Thus in any case, the implement may be easily and quickly adjusted to provide for cultivating close to, or farther from, a row of growing plants.

The implement is particularly adapted for intensive farming or the rapid cultivation of growing crops, and is easily adapted to be hauled by a single draft animal.

What I claim is:—

In a cultivator of the type indicated, the combination with a central beam and flat transverse bars forming the main frame and secured to the beam, of the shovel-carrying standards, and two pairs of right angular transverse bars 7 and 10 whose ends are bent forward at a right angle, the standards being laid alongside such ends and secured thereto, the bodies of the right angular bars being lapped, and hooked screw-bolts embracing the same and passing through the beam, thus serving to secure the angular bars in any required endwise adjustment, substantially as described.

JOHN J. RAMPLEY.

Witnesses:
G. M. PARKER,
GEO. L. GOODE.